(12) United States Patent
Koyama et al.

(10) Patent No.: US 8,797,304 B2
(45) Date of Patent: Aug. 5, 2014

(54) DISPLAY DEVICE AND ELECTRONIC DEVICE

(75) Inventors: Jun Koyama, Kanagawa (JP); Takayuki Ikeda, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 790 days.

(21) Appl. No.: 12/535,297

(22) Filed: Aug. 4, 2009

(65) Prior Publication Data

US 2010/0033450 A1     Feb. 11, 2010

(30) Foreign Application Priority Data

Aug. 8, 2008  (JP) ................................. 2008-205994

(51) Int. Cl.
*G09G 5/00* (2006.01)

(52) U.S. Cl.
USPC ................................. 345/207; 345/76; 345/87

(58) Field of Classification Search
CPC ..................... G09G 2360/14; G09G 2360/141; G09G 2360/142; G09G 2360/144; G09G 2360/145; G09G 2360/147; G09G 2360/148
USPC ............. 345/173, 175, 204, 207, 214, 76–77, 345/81, 87, 88
See application file for complete search history.

(56) References Cited

U.S. PATENT DOCUMENTS

| | | | |
|---|---|---|---|
| 5,204,661 A | 4/1993 | Hack et al. | |
| 5,655,940 A * | 8/1997 | Hodson et al. | 445/24 |
| 6,219,022 B1 * | 4/2001 | Yamazaki et al. | 345/103 |
| 6,421,041 B2 * | 7/2002 | Yamazaki et al. | 345/103 |
| 6,466,265 B1 | 10/2002 | Lee et al. | |
| 6,590,562 B2 * | 7/2003 | Yamazaki et al. | 345/103 |
| 6,747,290 B2 | 6/2004 | Yamazaki et al. | |
| 6,747,638 B2 | 6/2004 | Yamazaki et al. | |
| 6,750,838 B1 | 6/2004 | Hirakata | |
| 6,825,900 B2 | 11/2004 | Kawashima | |
| 7,006,080 B2 | 2/2006 | Gettemy | |
| 7,068,246 B2 | 6/2006 | Yamazaki et al. | |
| 7,158,129 B2 * | 1/2007 | Nakajima | 345/207 |
| 7,354,329 B2 * | 4/2008 | Derraa | 445/24 |
| 7,425,937 B2 * | 9/2008 | Inukai | 345/76 |
| 7,525,523 B2 | 4/2009 | Yamazaki et al. | |

(Continued)

FOREIGN PATENT DOCUMENTS

EP     0 490 683 A2     6/1992
EP     0 967 795 A2     12/1999

(Continued)

OTHER PUBLICATIONS

European Search Report re application No. EP 09166068.8, dated Jun. 18, 2010.

(Continued)

*Primary Examiner* — Jason Mandeville
(74) *Attorney, Agent, or Firm* — Husch Blackwell LLP

(57) ABSTRACT

To increase a reading speed in a display device having a touch-panel function. The display device includes a display panel 101 and a controller substrate 115. The display panel 101 includes a pixel portion 102, source drivers 103, 104, 105, 106, 107, 108, 109, and 110, display gate drivers 111 and 112, and reading gate drivers 113 and 114. The controller substrate 115 includes a controller IC 116. The controller substrate 115 is electrically connected to the display panel 101 through a connecting FPC 117.

10 Claims, 16 Drawing Sheets

(56) References Cited

U.S. PATENT DOCUMENTS

| | | | |
|---|---|---|---|
| 7,564,443 B2* | 7/2009 | Takatori et al. | 345/103 |
| 7,671,848 B2* | 3/2010 | Harada | 345/173 |
| 7,773,078 B2* | 8/2010 | Lee et al. | 345/207 |
| 2001/0031074 A1 | 10/2001 | Yamazaki et al. | |
| 2002/0154089 A1 | 10/2002 | Yamazaki et al. | |
| 2005/0116937 A1* | 6/2005 | Choi et al. | 345/173 |
| 2005/0219229 A1* | 10/2005 | Yamaguchi | 345/173 |
| 2006/0033729 A1 | 2/2006 | Yoshida et al. | |
| 2006/0220077 A1 | 10/2006 | Hayashi et al. | |
| 2006/0262055 A1* | 11/2006 | Takahara | 345/81 |
| 2007/0205999 A1 | 9/2007 | Akimoto et al. | |
| 2008/0129653 A1* | 6/2008 | Yamazaki | 345/55 |
| 2008/0164473 A1 | 7/2008 | Tai et al. | |
| 2008/0231584 A1 | 9/2008 | Hirakata | |
| 2008/0238860 A1 | 10/2008 | Onodera | |
| 2009/0201230 A1 | 8/2009 | Smith | |
| 2009/0273595 A1 | 11/2009 | Hirakata | |
| 2009/0295769 A1 | 12/2009 | Yamazaki et al. | |

FOREIGN PATENT DOCUMENTS

| | | |
|---|---|---|
| EP | 1 122 792 A2 | 8/2001 |
| EP | 1 944 806 A2 | 7/2008 |
| GB | 2 439 098 A | 12/2007 |
| JP | 4-302593 | 10/1992 |
| JP | 2001-292276 | 10/2001 |
| JP | 2006-244218 | 9/2006 |
| JP | 2006-267967 | 10/2006 |
| JP | 2007-11152 | 1/2007 |
| JP | 2007-102154 | 4/2007 |
| JP | 2008-249780 | 10/2008 |
| WO | WO 2007145347 A1 * | 12/2007 |
| WO | WO 2008/001106 A1 | 1/2008 |

OTHER PUBLICATIONS

European Office Action re application No. EP 09166068.8, dated Mar. 19, 2013.

* cited by examiner

DISPLAY DEVICE AND ELECTRONIC DEVICE

BACKGROUND OF THE INVENTION

1. Field of the Invention

The present invention relates to a display device. In particular, the present invention relates to a display device having a touch-panel function (such display device is also referred to as a display device with a touch-panel function). Further, the present invention relates to an electronic device including the display device in a display portion.

2. Description of the Related Art

In recent years, mobile phones, portable music players, portable liquid crystal television, and the like have become popular with the development of communication technology. It is expected that a moving image will be transferred further and more amount of information will be transmitted in the future. On the other hand, a personal computer (PC) for mobile use has been produced due to the weight reduction. Information terminals called PDAs (personal digital assistant) such as electronic databooks are produced in large amount and coming into wide use. In addition, with development of display devices, the majority of such portable information devices are provided with a flat panel display.

Moreover, in recent years, in an active matrix display device, productization of a display device using a low-temperature polysilicon thin film transistor (hereinafter a thin film transistor is denoted to as a TFT) has been promoted. In the case where low-temperature polysilicon TFT is used, since a signal line driver circuit can be formed integrally in the periphery of a pixel portion as well as a pixel, a display device can be made smaller and have higher definition. Such a display device is expected to be more widely used in the future.

As electronic devices using such active matrix display devices, electronic devices having a touch-panel function are coming into wide use. The touch-panel function is to input information not by using a keyboard but by touching a display screen with a finger or a pen. Note that in the documents of this application (specification and claims), not being limited to inputting information by bringing an object to be read such as a finger or a pen into contact with a display screen, the touch-panel function includes inputting information with light, for example, inputting information with reflected light from an object to be read such as a finger or a pen. In the case where information is input with light, the illuminance of light which enters a reading portion is read as the information. As an example of the above, reference shown below can be given.

Patent Document

Japanese Published Patent Application No. 2006-244218

SUMMARY OF THE INVENTION

The above-described conventional display device having the touch-panel function has a problem of low response speed. For example, when a letter is written with a touch pen or the like, reading of the movement of the pen is slow in some cases.

Conventional touch panels are driven at a frame frequency of 30 Hz or 60 Hz. FIG. 3 shows a timing of the driving. When a frame frequency is 60 Hz and the number of pixels is 480×640, the conventional touch panel has one frame period of 16.6 ms. By alternately performing display operation during a display period 301 and performing reading operation during a reading period 302, the conventional touch panel reads information input with a pen and displays the information which has been read.

Moreover, FIG. 2 shows a block diagram of the conventional display device having the touch-panel function.

A display device 200 shown in FIG. 2 includes a display panel 201 having a pixel portion 202 which has a plurality of pixels 210 each provided with an optical sensor, a source driver 203, a display gate driver 204, a source driver 205, and a reading gate driver 206; a controller substrate 207 having a controller IC 208; and an FPC (flexible printed circuit) 209 which connects the display panel 201 and the controller substrate 207 to each other.

Moreover, FIG. 4 shows operation of the conventional display device with the touch-panel function. As shown in FIG. 4, in the conventional display device with the touch-panel function, it takes 16.6 ms to scan a screen from upper left to lower right.

In that case, since a point on the screen is read and the next point is read 33.3 ms after that, when a pen is quickly moved, information between these read points is largely omitted in displaying the information input with the pen, which is a problem. In this manner, when a speed of reading a shape drawn with a pen tip is low, the shape cannot be reproduced on the screen. Therefore, a touch panel with a high reading speed is demanded.

In view of the aforementioned problems, an object of one embodiment of the present invention is to increase a reading speed.

In order to solve the aforementioned problems, an object of one embodiment of the present invention is to provide a display device having a touch-panel function, in which the total reading time (a time for reading information input to a reading portion with an object to be read) is shortened by dividing a pixel portion into a plurality of regions, performing reading operation in at least two of the plurality of regions of the divided pixel portion at the same time, and reading a plurality of points at the same time in the pixel portion, in order to increase a reading speed.

A structure of one embodiment of the present invention is described below.

According to one embodiment of the present invention, a display device having a touch-panel function includes a pixel portion which is divided into a plurality of regions in a display period and a reading period and includes pixels each of which performs display operation or reading operation of each region in the plurality of regions at the same time; a display gate driver; a reading gate driver; and a plurality of source drivers. The pixel includes a display portion in which display operation is controlled by the display gate driver and any one of the plurality of source drivers and a reading portion in which reading operation is controlled by the reading gate driver and any one of the plurality of the source drivers.

According to one embodiment of the present invention, a display device having a touch-panel function includes a pixel portion which is divided into a plurality of regions in a display period and a reading period and includes pixels each of which performs display operation or reading operation of each region in the plurality of regions at the same time; a display gate driver; a reading gate driver; a plurality of source drivers; and a controller circuit for performing signal processing on output signals from the plurality of source drivers. The pixel includes a display portion in which the display operation is controlled by the display gate driver and any one of the plurality of source drivers and a reading portion in which the reading operation is controlled by the reading gate driver and any one of the plurality of source drivers. The display portion includes a display element. The reading portion includes a photoelectric conversion element.

According to one embodiment of the present invention, the display element is a liquid crystal element having a first terminal and a second terminal, and the display portion may include a first transistor with a gate, a source and a drain, in which the gate is electrically connected to the display gate driver, one of the source and the drain is electrically connected to any one of the plurality of source drivers, and the other of the source and the drain is electrically connected to the first terminal of the liquid crystal element; and a capacitor element having a first terminal and a second terminal, in which the first terminal is electrically connected to the other of the source and the drain of the first transistor.

According to one embodiment of the present invention, the photoelectric conversion element is a photo diode having a first terminal and a second terminal, and the reading portion may include a second transistor having a gate, a source and a drain, in which the gate is electrically connected to the first terminal of the photo diode, and one of the source and the drain is electrically connected to any one of the plurality of source drivers.

One embodiment of the present invention is an electronic device including the display device having the touch-panel function in a display portion.

Note that a transistor in the document of this application (specification and claims) has a gate, a source and a drain. For example, in a field-effect transistor, a gate refers to a portion of a gate electrode (including a region, a conductive layer, a wiring, and the like which serve as the gate) or part or all of a portion which is electrically connected to the gate electrode. In addition, a source refers to part of a source electrode (including a region, a conductive layer, a wiring, and the like which serve as the source) or part or all of a portion which is electrically connected to the source electrode. Further, a drain refers to part of a drain electrode (including a region, a conductive layer, a wiring, and the like which serve as a drain) or part or all of a portion which is electrically connected to the drain electrode.

Since a source and a drain of a transistor in the document of this application (specification and claims) interchange depending on the structure, the operating conditions, or the like of the transistor, it is difficult to define which is the source or the drain. Therefore, one terminal which is selected from a source and a drain at will is called one of the source and the drain, whereas the other terminal is called the other of the source and the drain.

Note that in the document of this application (specification and claims), a diode (including a photo diode) includes an anode and a cathode. A terminal of one of the anode and the cathode is denoted as a first terminal of a diode and the other of the terminals of the anode and the cathode is denoted as a second terminal of the diode.

In a display device of one embodiment of the present invention, a touch panel with a high reading speed is realized by performing display operation and reading operation with the use of a plurality of source drivers. Although conventional touch panels have inadequate reading speed in inputting with a pen and cannot adequately perform reading, one embodiment of the present invention can solve such a problem and improve reading performance.

DETAILED DESCRIPTION OF THE INVENTION

In this embodiment, a structure of a display device which is one embodiment of the present invention will be described.

Figure 1:
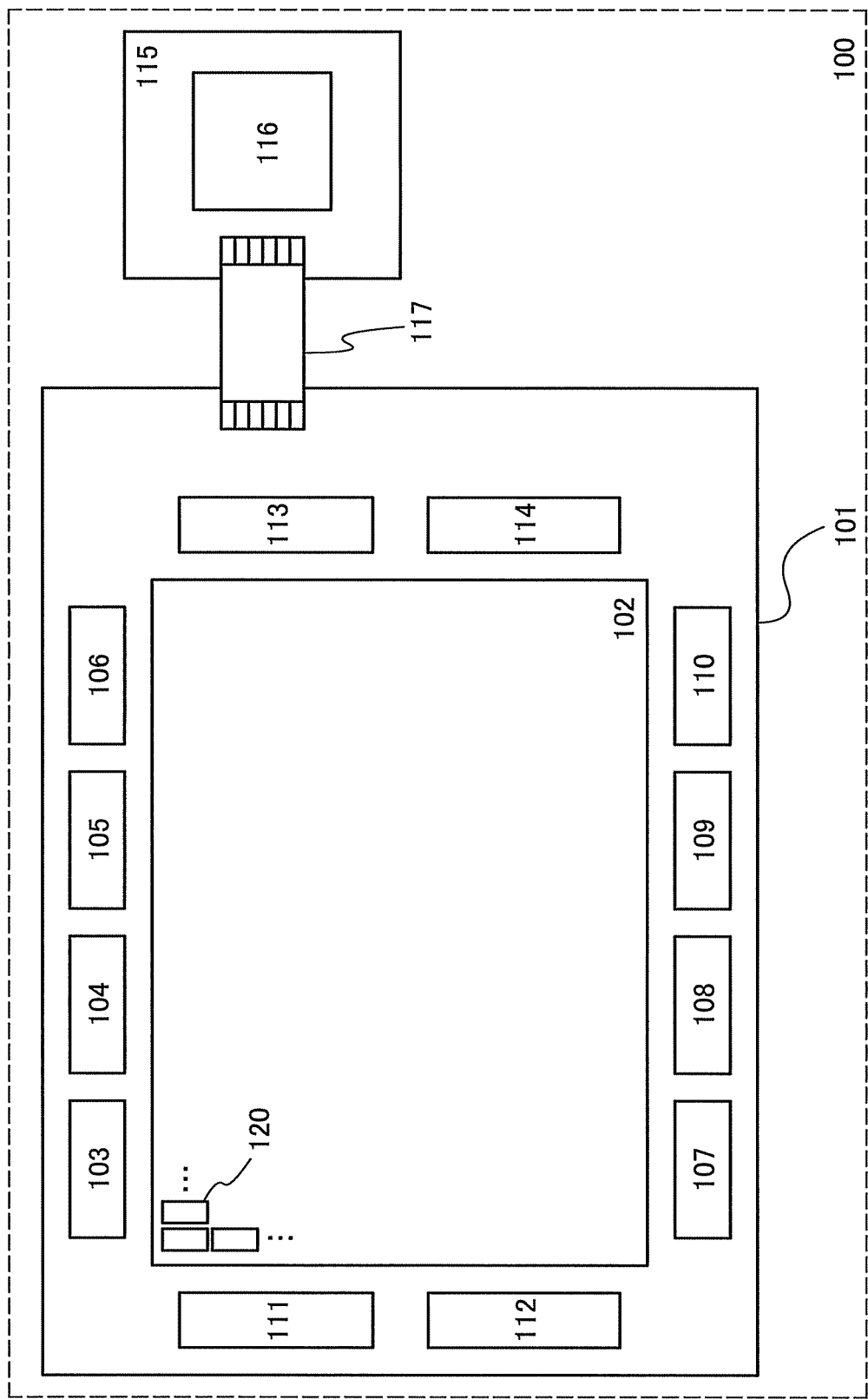
FIG. 1 is a block diagram illustrating an example of a structure of a display device according to one embodiment of the present invention.
Figure 2:
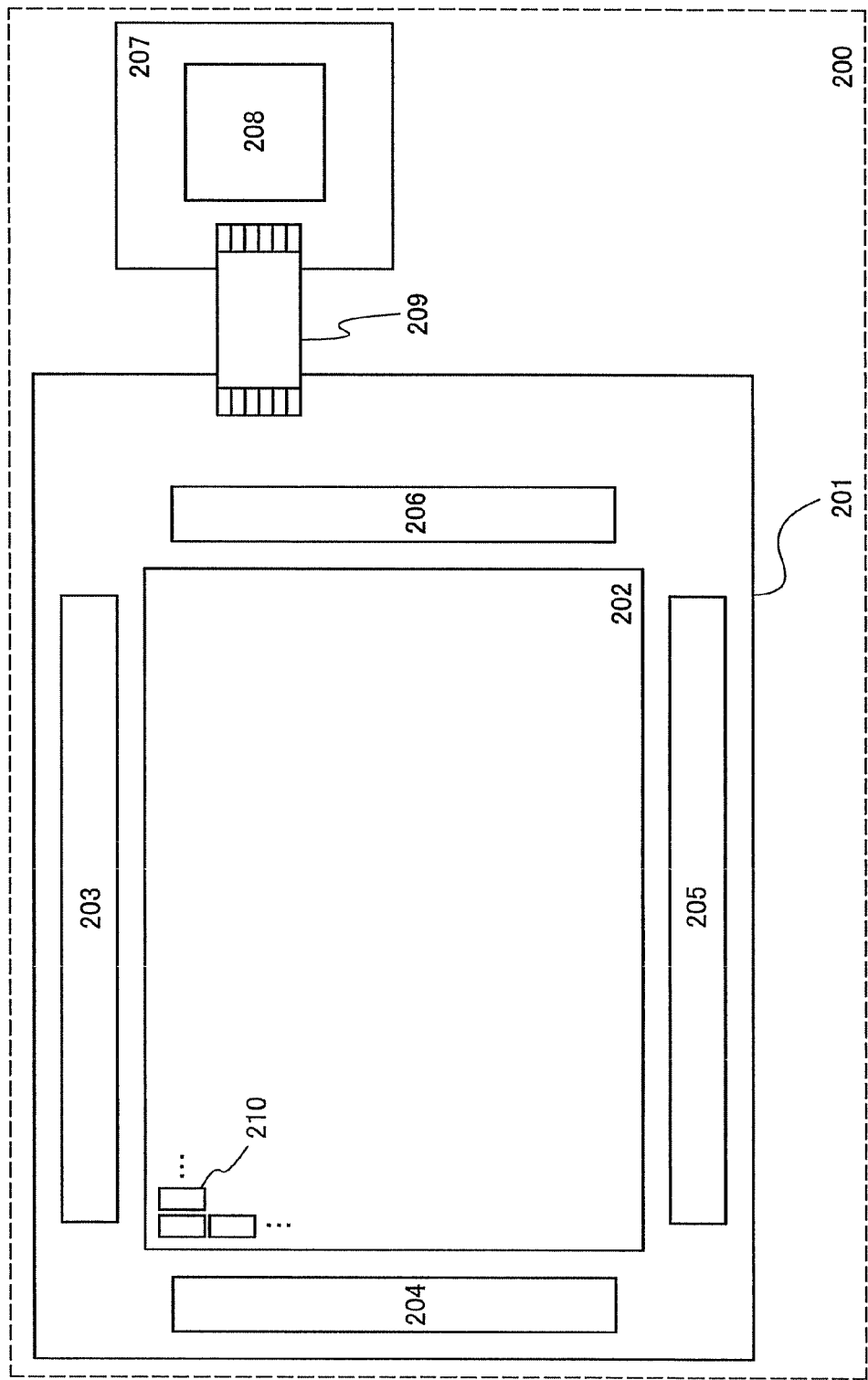
FIG. 2 is a block diagram illustrating a conventional display device having a touch-panel function.
Figure 3:
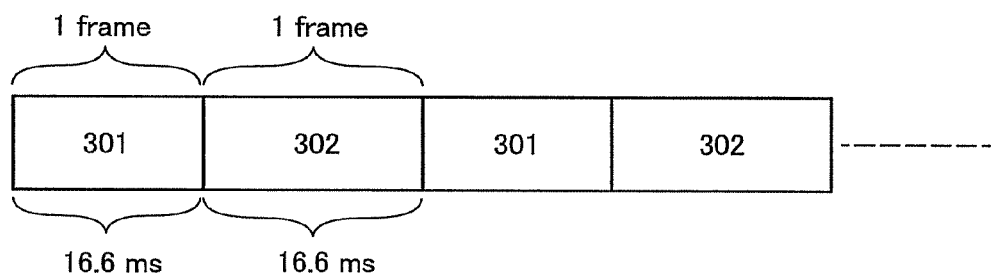
FIG. 3 is a diagram illustrating a display period and a reading period of a conventional display device having a touch-panel function.

FIG. 1 shows a block diagram illustrating an example of a structure of a display device in this embodiment. A display device 100 shown in FIG. 1 includes a display panel 101 and a controller substrate 115.

Further, the display panel 101 includes a pixel portion 102 having a plurality of pixels 120, a source driver 103, a source driver 104, a source driver 105, a source driver 106, a source driver 107, a source driver 108, a source driver 109, a source driver 110, a display gate driver 111, a display gate driver 112, a reading gate driver 113, and a reading gate driver 114. Note that the numbers of the source drivers, the display gate drivers, and the reading gate drivers are not limited to those shown in FIG. 1. Note that although the source drivers shown in FIG. 1 are used for both of reading and display, the display device of this embodiment is not limited to this and reading source drivers and display source drivers may be separately provided.

Furthermore, the controller substrate 115 includes a controller IC 116. Furthermore, the controller substrate 115 is electrically connected to the display panel 101 through a connecting FPC 117.

The pixel 120 includes a display portion and a reading portion. In the display portion, the display gate driver and any one of the plurality of source drivers perform display operation. That is, in the display portion, display operation is controlled by the display gate driver and any one of the plurality of source drivers. In the reading portion, the reading gate driver and any one of the plurality of source drivers perform reading operation. That is, in the reading portion, reading operation is controlled by the reading gate driver and any one of the plurality of source drivers. Further, the display portion includes a display element, and the reading portion includes a photoelectric conversion element.

In the display device shown in FIG. 1, the pixel portion is divided into a plurality of regions in a display period and a reading period. In addition, the pixel portion includes, in each region, pixels each of which performs display operation or reading operation in the plurality of regions at the same time. In specific, the display gate driver and any one of the plurality of source drivers perform display operation for the pixels 120 in each region, and the reading gate driver and any one of the plurality of source drivers perform reading operation for the pixels 120 in each region. Note that although display operation and reading operation are performed in the display device in FIG. 1 by dividing the pixel portion into eight regions in the display period and the reading period, the number of division is not limited to eight in the display device of this embodiment.

Figure 4:
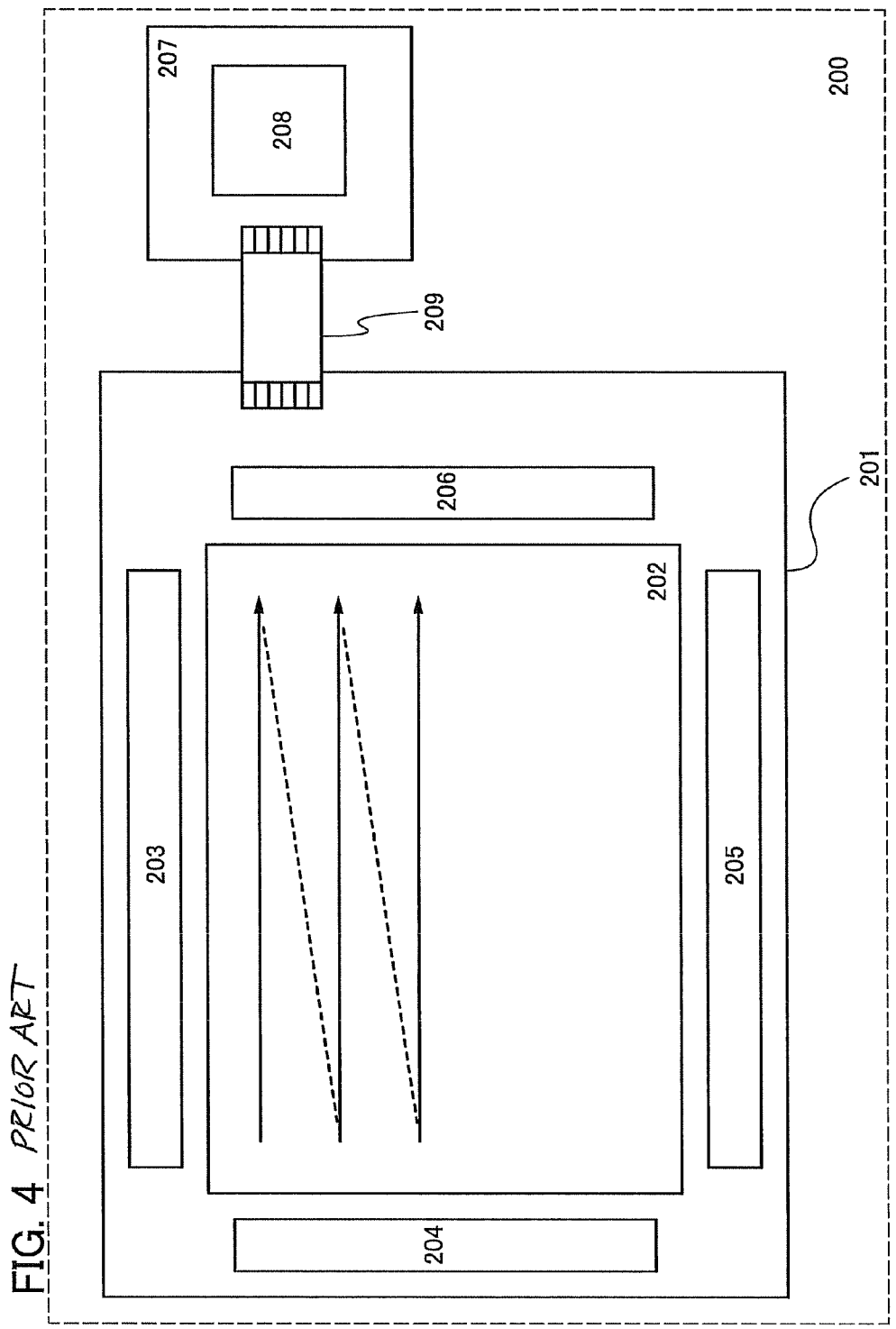
FIG. 4 is a diagram illustrating operation of a conventional display device having a touch-panel function.

A conventional display device shown in FIG. 4 is driven by sequentially scanning pixels with respect to each scanning line from the upper left to the lower right of a screen. Thus, since the scanning is only one way, a scanning time is long.

Figure 5:
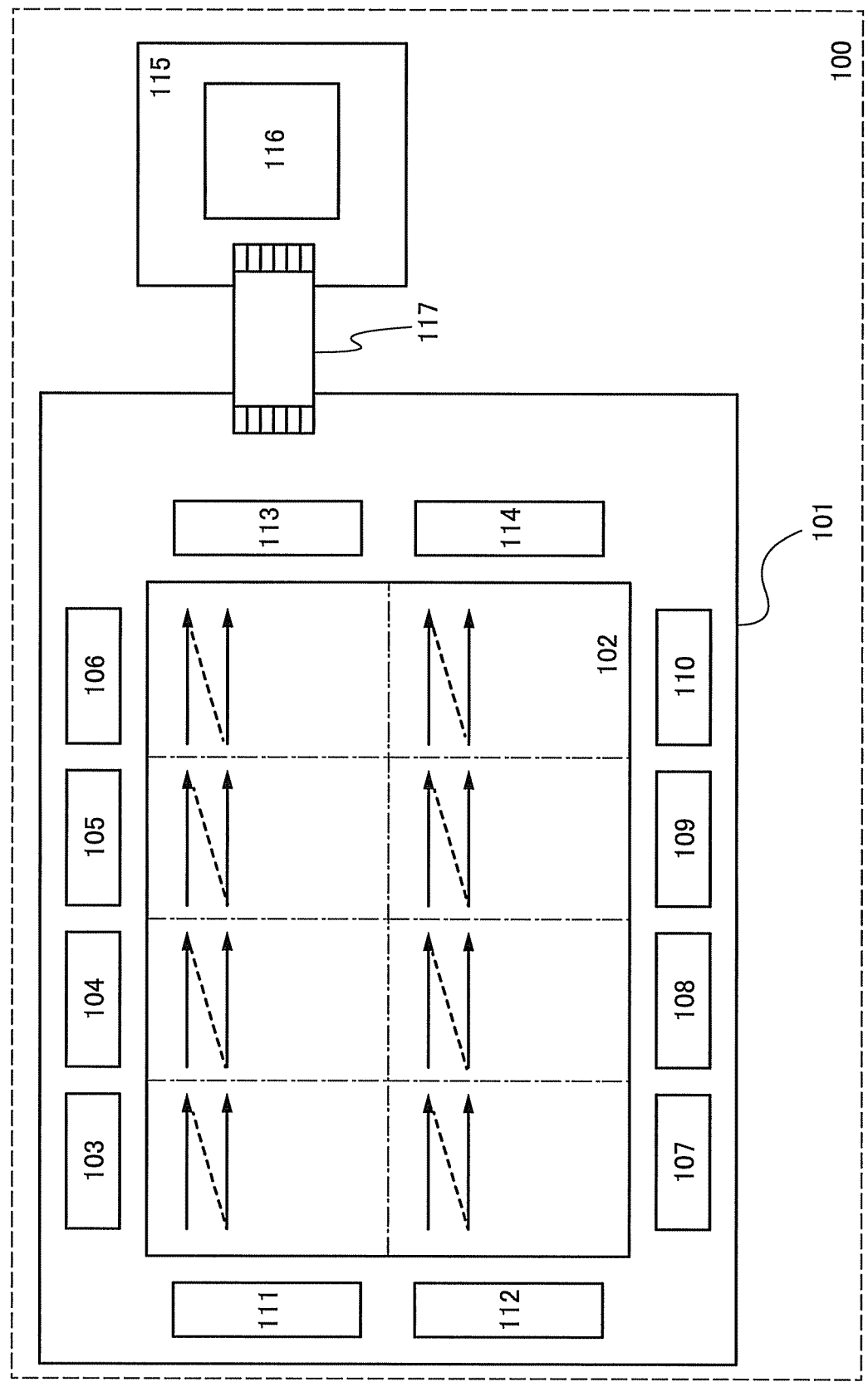
FIG. 5 is a diagram illustrating operation of a display device which is one embodiment of the present invention.

On the other hand, in one example of the display device of this embodiment, which is shown in FIG. 5, a reading gate driver and any of a plurality of source drivers perform reading operation in the pixel 120 with respect to each divided region. Therefore, for example, a reading time can be shortened by scanning pixels in a plurality of regions at the same time. In specific, in the case where the pixel portion is divided into eight regions, the reading time can be ⅛.

Output signals from the source drivers 103 to 110 are output to the controller IC 116 through the FPC 117, and signal processing is performed on the output signals. The signal processing is to process a signal based on information read and convert it into a display signal, for example, to transmit input data to an external microcomputer (not shown).

Figure 6:
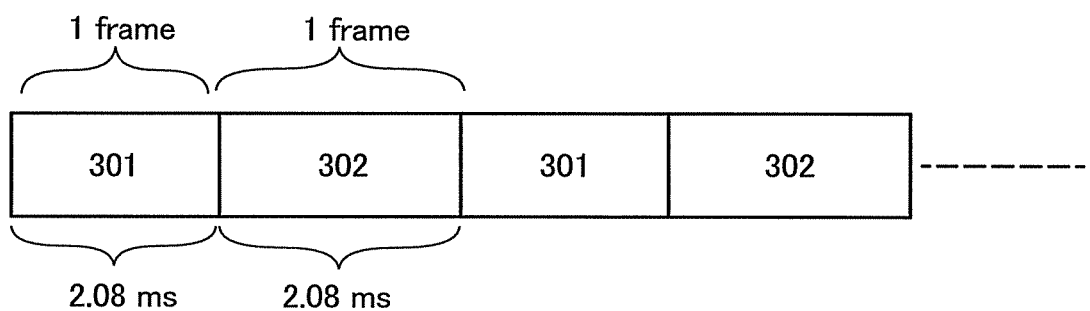
FIG. 6 is a diagram illustrating a display period and a reading period of a display device which is one embodiment of the present invention.

As shown in this embodiment, since the reading gate driver and the plurality of source drivers perform reading operation, when the number of pixels is 480×640, a conventional reading period of 16.6 ms can be shortened to a reading period 302 of 2.08 ms as shown in FIG. 6. In addition, since the display gate driver and the plurality of source drivers perform display operation, when the number of pixels is 480×640, a conventional display period of 16.6 ms can be shortened to a display period 301 of 2.08 ms as shown in FIG. 6. Therefore, since the reading speed and the display speed can be increased, the total processing time can be shortened. Note that although the length of the display period and the length of the reading period are set to be the same in FIG. 6, they are not necessarily the same and can be changed as long as response is not adversely affected.

Figure 7:
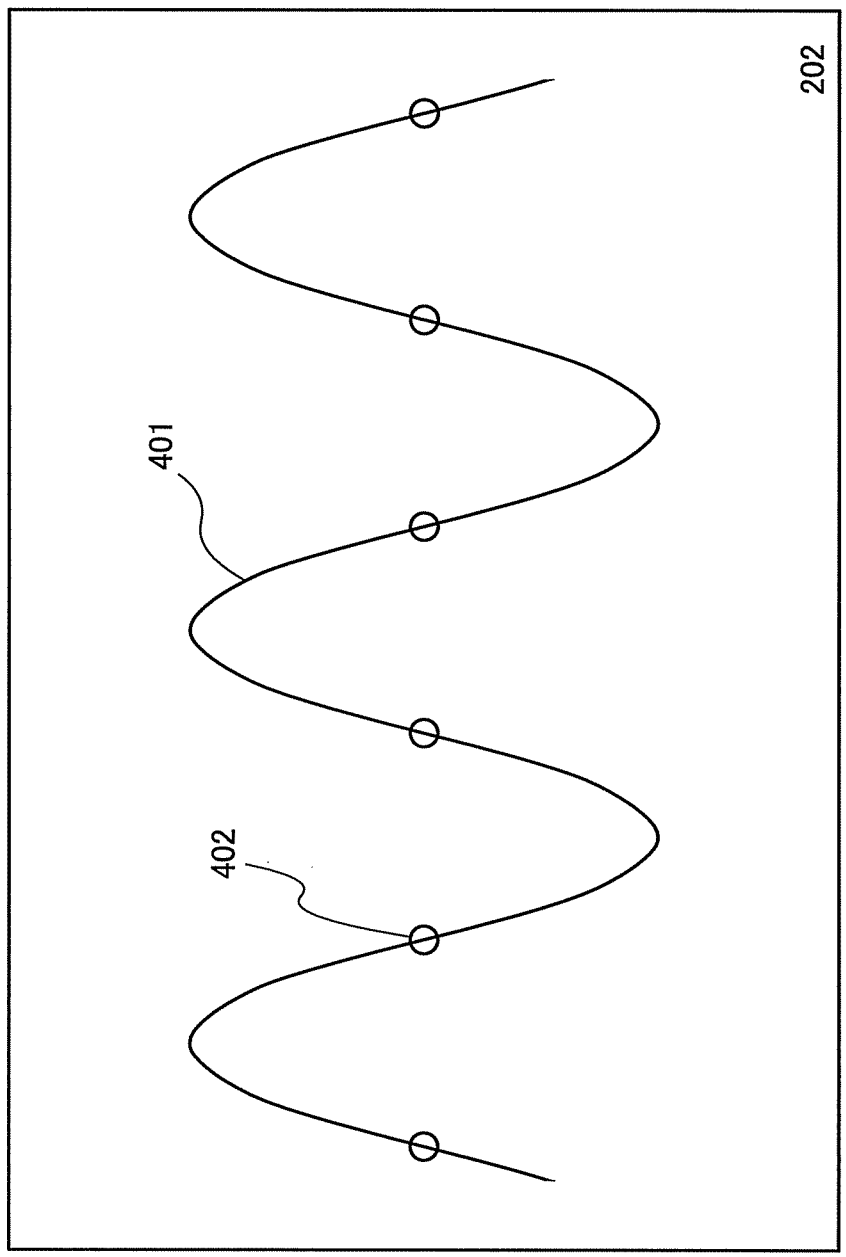
FIG. 7 is a diagram illustrating inputting with a pen in a conventional display device having a touch-panel function.
Figure 8:
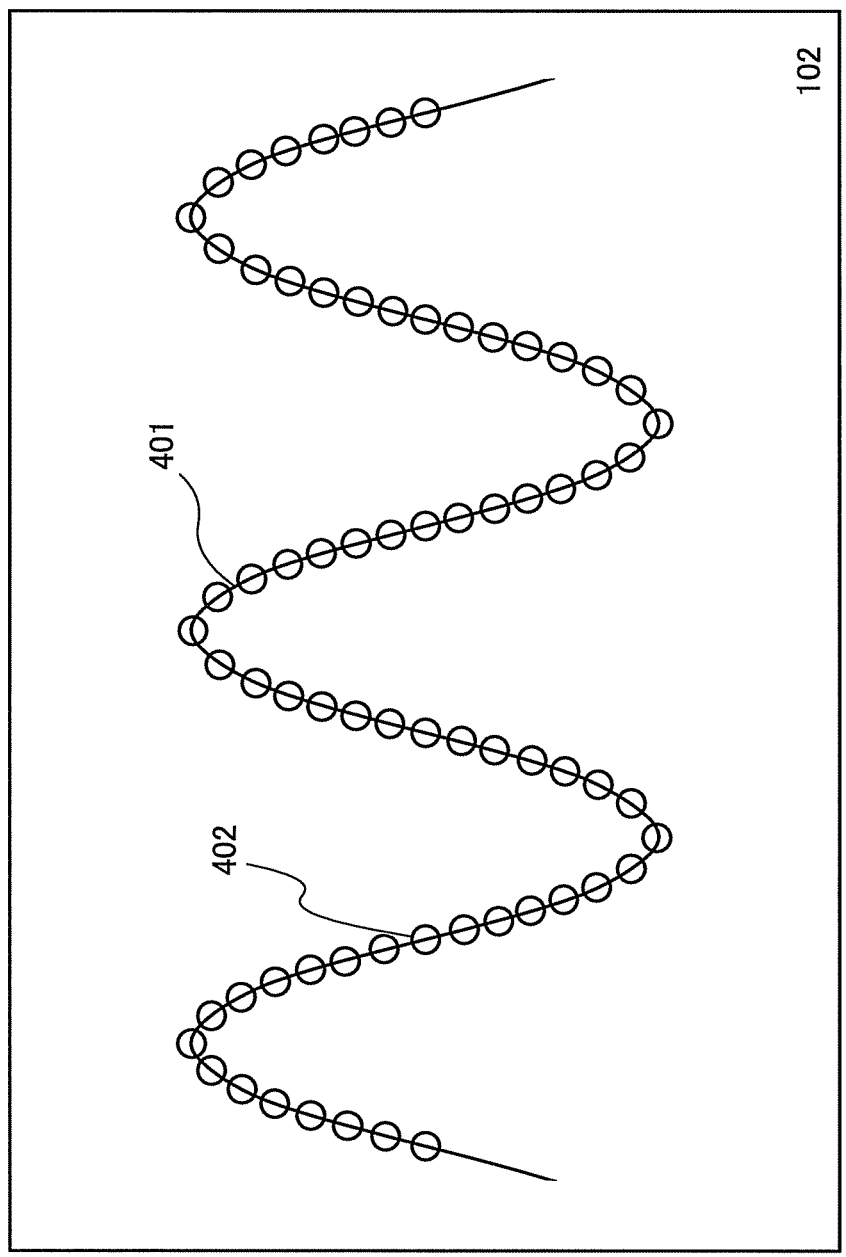
FIG. 8 is a diagram illustrating inputting with a pen in a display device which is one embodiment of the present invention.

Further, as shown in FIG. 7, in the conventional display device with the touch-panel function, in drawing a path 401 with a pen on a touch panel, when the pen is quickly moved, the path 401 cannot be correctly reproduced as shown by reading points 402 because of long reading intervals. In the display device which is one embodiment of the present invention, by increasing the reading speed, the reading points 402 can follow the path 401 as shown in FIG. 8, so that the path of the pen can be correctly reproduced.

EXAMPLE 1

In Example 1, a structure of a pixel in a display portion of a display device which is one embodiment of the present invention will be described.

Figure 9:
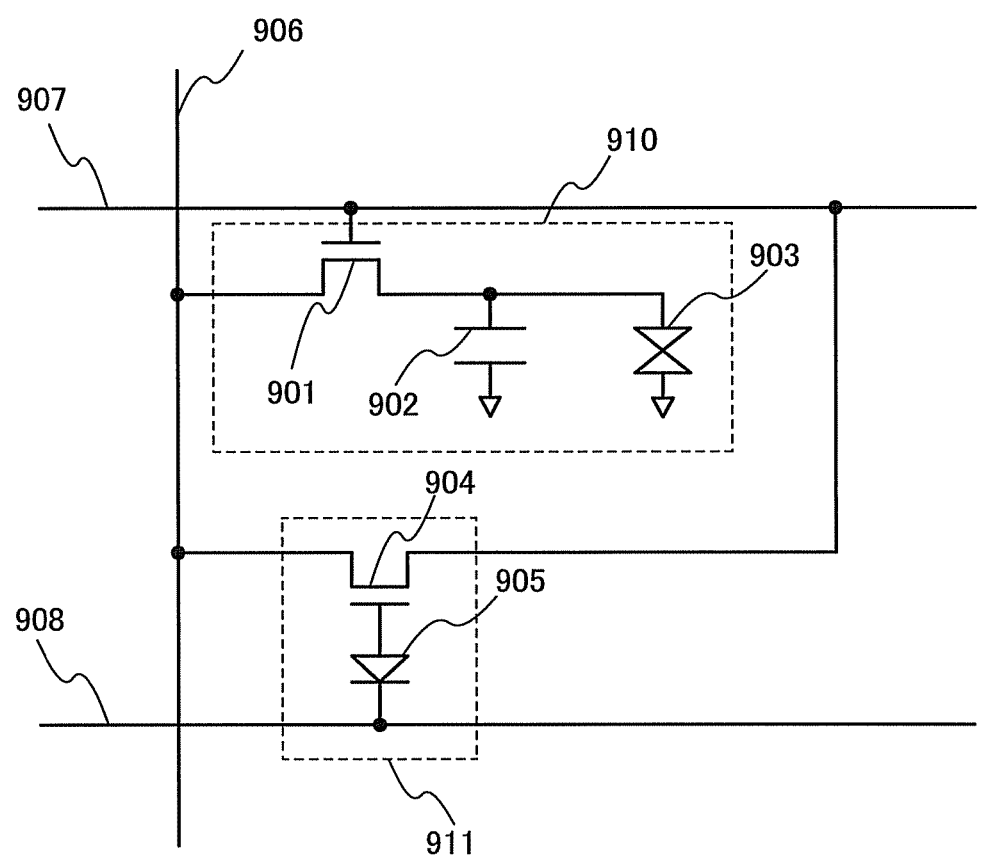
FIG. 9 is a diagram illustrating an example of a structure of a pixel in a display device in Example 1.

FIG. 9 illustrates an example of the structure of the pixel in the display device of Example 1. Note that in Example 1, although a liquid crystal display device is described as an example of the display device, the display device which is one embodiment of the present invention is not limited to the liquid crystal display device and may be a different display device such as a display device using EL (also referred to as electroluminescence) (such a display device is also referred to as an EL display device).

The pixel shown in FIG. 9 includes a display portion 910 and a reading portion 911.

The display portion 910 includes a display driver TFT 901 which is a first transistor and functions as a liquid crystal element driver (also referred to as a display driver) TFT, a storage capacitor 902 which is a capacitor element, and a liquid crystal element 903 which is a display element.

A gate of the display driver TFT 901 is electrically connected to one of the display gate driver 111 and the display gate driver 112 which are shown in FIG. 1 through a gate line 907. One of a source and a drain of the display driver TFT 901 is electrically connected to any one of the plurality of source drivers 103 to 110 which is shown in FIG. 1 through a source line 906.

The storage capacitor 902 has a first terminal and a second terminal. The first terminal is electrically connected to the other of the source and the drain of the display driver TFT 901 and a fixed potential is applied to the second terminal.

The liquid crystal element 903 has a first terminal and a second terminal. The first terminal is electrically connected to the first terminal of the storage capacitor 902 and the second terminal is electrically connected to a counter substrate (not shown).

The reading portion 911 includes a reading TFT 904 which is a second transistor and a photo diode 905 which is a photoelectric conversion element.

One of a source and a drain of the reading TFT 904 is electrically connected to any one of the source drivers 103 to 110 through the source line 906. The other of the source and the drain of the reading TFT 904 is electrically connected to one of the reading gate drivers 113 and 114 through the gate line 907.

A first terminal of the photo diode 905 is electrically connected to the gate of the reading TFT 904 and a second terminal of the photo diode 905 is electrically connected to a photo diode driver line (also referred to as a PD driver line) 908 which is a photoelectric conversion element driver line.

Next, operation of the pixel in the display portion of the display device in Example 1 during a display period will be described.

Operation during the display period 301 shown in FIG. 6 is performed by the display driver TFT 901, the storage capacitor 902, and the liquid crystal element 903.

First, the gate line 907 is turned active in writing, the display driver TFT 901 is turned on, and the potential of the source line 906, the potential of the first terminal of the storage capacitor 902, and the potential of the liquid crystal element 903 become equal. When writing is completed, the gate line 907 is turned non-active, the display driver TFT 901 is turned off, and the state is held until the next writing. This operation is the same as that of a known liquid crystal display device. Note that in Example 1, in the case where the transistor is an n-channel transistor, the term "active" means a state in which a High level (also referred to as H level) signal is input, and the term "non-active" means a state in which a Low level (also referred to as L level) signal is input.

Next, operation of the pixel in the reading portion of the display device in Example 1 during a reading period will be described.

Operation during the reading period 302 shown in FIG. 6 is performed by the reading TFT 904 and the photo diode 905.

First, during the display period, the photo diode driver line 908 is set to have a potential which is adequately lower than the potential of the source line 906. At that time, the reading TFT 904 is in an off-state and does not operate.

Next, during the reading period, the source line 906 is precharged to a certain potential by the source drivers 103 to 110. Then, the potential of the photo diode driver line 908 is increased to a high potential. A potential obtained by adding a voltage, which is applied between an anode and a cathode of the photo diode 905, to the potential of the photo diode driver line 908 is applied to the gate of the reading TFT 904. The voltage applied between the anode and the cathode of the photo diode 905 is determined based on the amount of light with which the photo diode 905 is irradiated.

The reading TFT 904 is turned on and electric charge is discharged from the source line 906 which has been precharged. At that time, the gate line 907 is set to have a low potential so that current can flow from the source line 906 to the gate line 907.

A potential to be applied to the gate of the reading TFT 904 differs depending on the intensity of light (e.g., reflected light from an object to be read) with which the photo diode 905 is irradiated. For example, when the intensity of light is high, a high potential is applied to the gate of the reading TFT 904; when the intensity of light is low, a low potential is applied to the gate of the reading TFT 904.

Further, current which flows to the reading TFT 904 differs depending on a voltage applied to the gate of the reading TFT 904. When the intensity of light is high, a large amount of current flows to the reading TFT 904 and the potential of the source line 906 largely decreases. That is, as the intensity of light increases, the amount of current which flows between the source and the drain of the reading TFT 904 increases. On the other hand, when the intensity of light is low, the amount of current which flows to the reading TFT 904 is small, and the potential of the source line 906 hardly decreases. That is, as the intensity of light decreases, the amount of current which flows between the source and the drain of the reading TFT 904 decreases.

Figure 10:
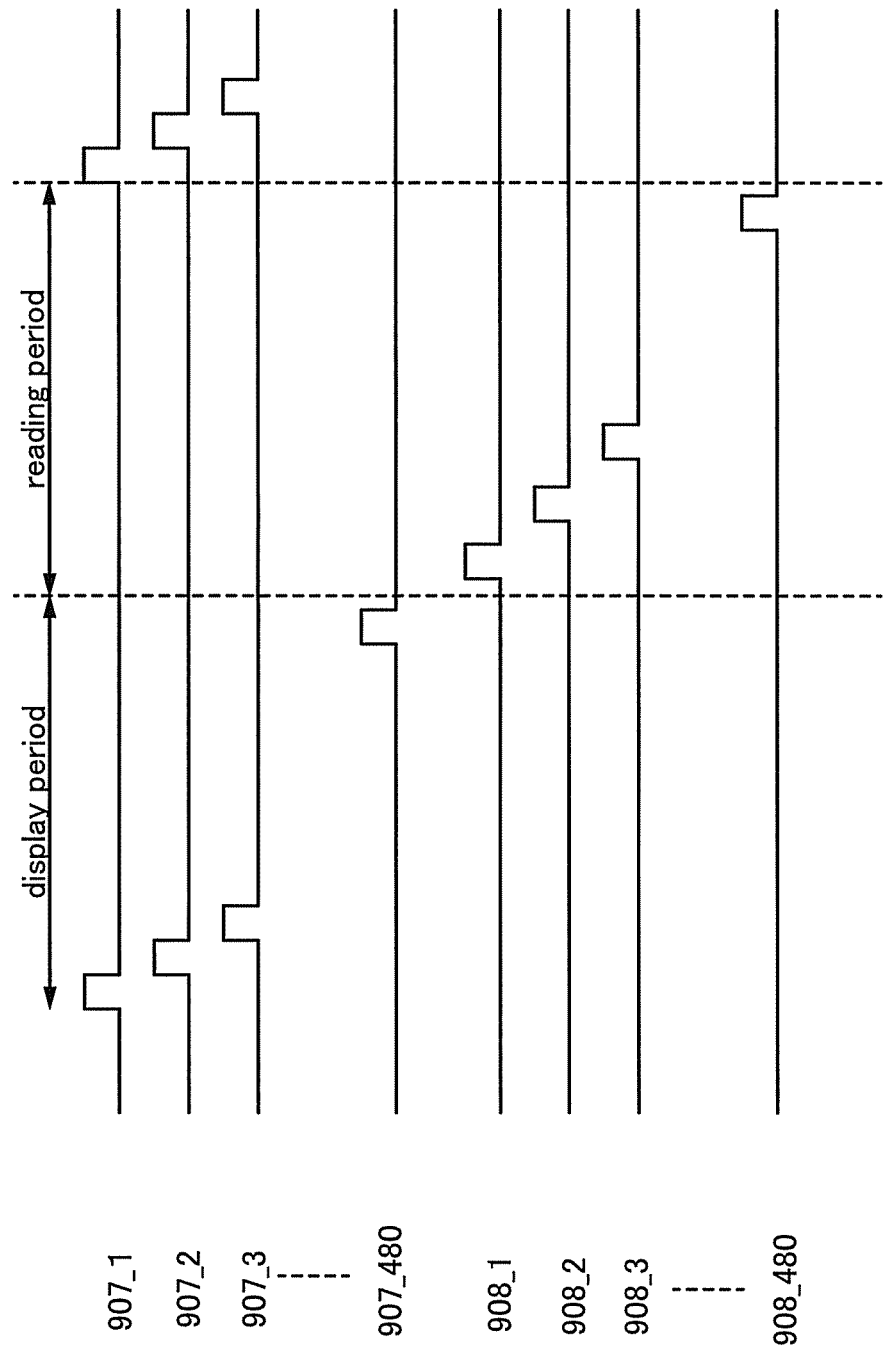
FIG. 10 is a diagram illustrating a driving timing of a pixel in a display device in Example 1.

By determining the intensity of light from the potential value of the source line 906, reading operation can be performed. FIG. 10 shows driving timings of the gate line 907 and the photo diode driver line 908 during the display period and the reading period.

As shown in FIG. 10, by setting each of a plurality of gate lines 907 (gate lines 907_1 to 907_480) and a plurality of photo diode driver lines 908 (PD driver lines 908_1 to 908_480) to turn active at a different timing, the pixel can be driven with respect to each line so that display operation or reading operation can be performed.

Further, by adjusting the pulse width of the photo diode driver line 908, the amount of electric charge discharged from the source line 906 can be controlled.

EXAMPLE 2

In Example 2, a structural example of a source driver in a display device which is one embodiment of the present invention will be described.

Figure 11:
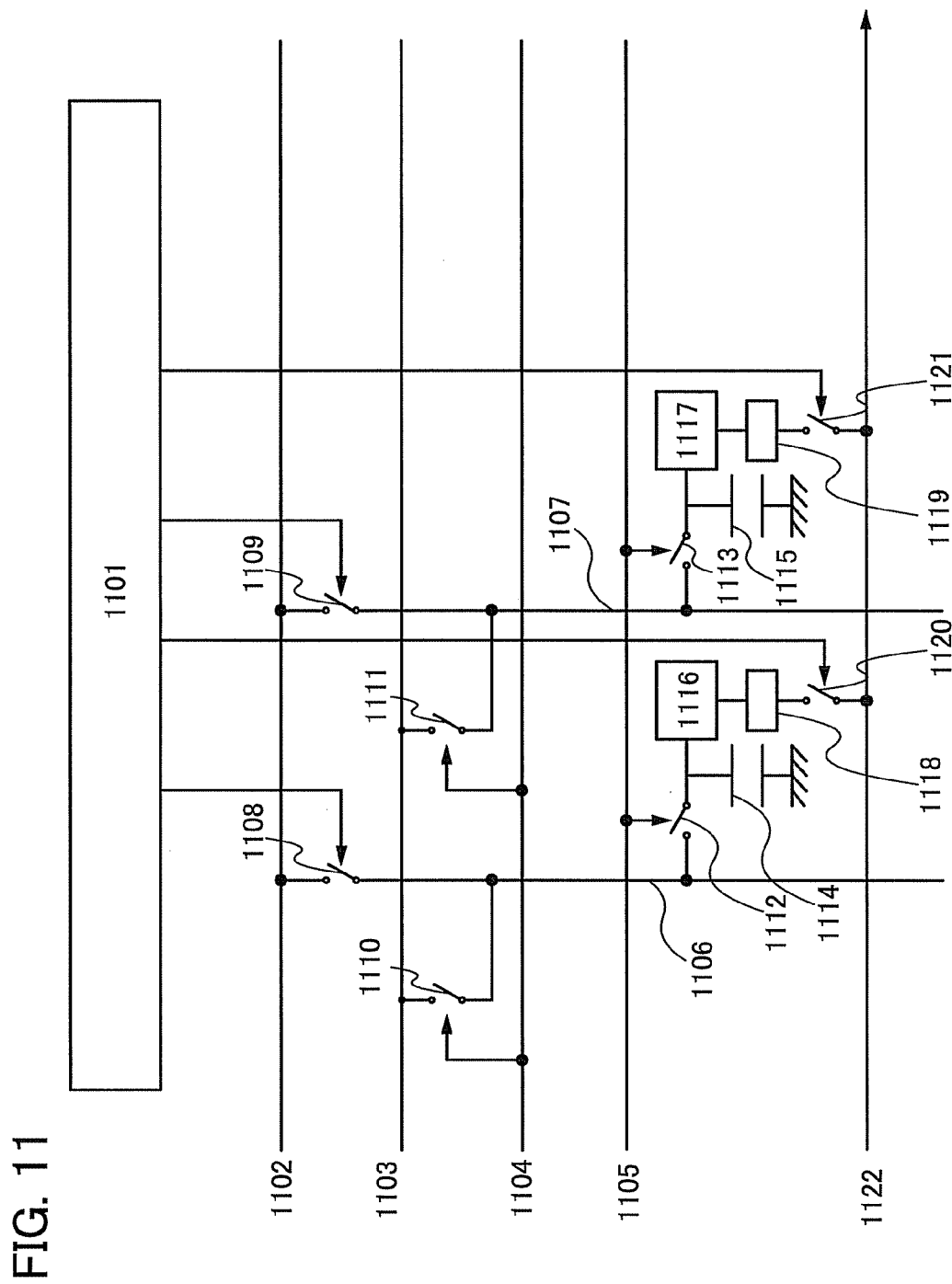
FIG. 11 is a diagram illustrating a structure of a source driver in a display device in Example 2.

FIG. 11 shows a structure of the source driver in the display device which is one embodiment of the present invention in Example 2.

As shown in FIG. 11, the source driver in the display device which is one embodiment in Example 2 includes a shift register 1101, a video signal line 1102, a precharge potential supply line 1103, a precharge signal line 1104, a charge signal line 1105, source lines 1106 and 1107, video signal input switches 1108 and 1109, precharge switches 1110 and 1111, charge switches 1112 and 1113, source line storage capacitors 1114 and 1115, A/D converters 1116 and 1117, latch circuits 1118 and 1119, output switches 1120 and 1121, and a digital output line 1122.

Note that although the shift register is shared between the source driver for reading and the source driver for display which are shown in FIG. 11, the source drivers in Example 2 do not share the shift register. There is no problem even if the reading source driver and the display source driver may each have a shift register. In addition, although FIG. 11 shows only two source lines for simplicity of description, more than or equal to three source lines can actually be provided.

The source line 1106 is electrically connected to the video signal line 1102 through the video signal input switch 1108, electrically connected to the precharge potential supply line 1103 through the precharge switch 1110, and electrically connected to a first terminal of the source line storage capacitor 1114 through the charge switch 1112.

In addition, the source line 1107 is electrically connected to the video signal line 1102 through the video signal input switch 1109, electrically connected to the precharge potential supply line 1103 through the precharge switch 1111, and electrically connected to a first terminal of the source line storage capacitor 1115 through the charge switch 1113.

The video signal input switches 1108 and 1109 are turned on and off in response to an output signal from the shift register 1101.

The precharge switches 1110 and 1111 are turned on and off in response to a signal input from the precharge signal line 1104.

The charge switches 1112 and 1113 are turned on and off in response to a signal input from the charge signal line 1105.

Further, the A/D converter 1116 is electrically connected to the first terminal of the source line storage capacitor 1114. The A/D converter 1117 is electrically connected to the first terminal of the source line storage capacitor 1115.

A ground potential is applied to second terminals of the source line storage capacitors 1114 and 1115.

Further, an input terminal of the latch circuit 1118 is electrically connected to the A/D converter 1116 and an output terminal of the latch circuit 1118 is electrically connected to the digital output line 1122 through the output switch 1120.

Further, an input terminal of the latch circuit 1119 is electrically connected to the A/D converter 1117 and an output terminal of the latch circuit 1119 is electrically connected to the digital output line 1122 through the output switch 1121.

The output switches 1120 and 1121 are turned on and off in response to signals input from the shift register 1101.

Operation of the source driver in FIG. 11 will be described below. During the display period 301 shown in FIG. 6, the precharge switches 1110 and 1111, the charge switches 1112 and 1113, and the output switches 1120 and 1121 are off. Analog video signals input from the video signal line 1102 are sequentially sampled by the shift register 1101 and the video signal input switches 1108 and 1109 and transmitted to the source lines 1106 and 1107. The operation of the source driver during the display period 301 is the same as that of known source drivers.

Next, operation during the reading period 302 in FIG. 6 will be described. During the reading period 302, the video signal input switches 1108 and 1109 are off. When the precharge signal line 1104 and the charge signal line 1105 are turned active, the precharge switches 1110 and 1111 and the charge switches 1112 and 1113 are turned on. Accordingly, the potentials of the source lines 1106 and 1107, the source line storage capacitors 1114 and 1115 are the same as that of the precharge potential supply line 1103. Next, the precharge switches 1110 and 1111 are turned off. Then, current which is based on the intensity of light flows to the reading TFT from the source line in the pixel, the potentials of the source lines 1106 and 1107 decrease in accordance with the intensity of the light. The potentials are converted into digital signals by the A/D converters 1116 and 1117 and are stored in the latch circuits 1118 and 1119. The digital signals are output to the digital output line 1122 when the output switches 1120 and 1121 are turned on by the shift register 1101. That is the reading operation.

Like the source driver described in Example 2, by digitalizing output signals, interface, that is, exchange of information between the display panel and the controller IC 116 can be easily performed. In addition, the display device which is one embodiment of the present invention can have a structure in which the A/D converter is electrically connected to the outside and the source driver outputs analog signals. Such a case can be realized by eliminating the A/D converter in the source driver and obtaining the potential of the source line through a buffer amplifier. In addition, although not disclosed in Example 2, a known circuit configuration can be applied to the gate driver and a special circuit configuration is not necessary.

Note that Example 2 can be appropriately combined with another example.

EXAMPLE 3

In Example 3, a pixel, which has a structure different from that shown in Example 1, in a pixel portion of the display device which is one embodiment of the present invention will be described.

Figure 15:
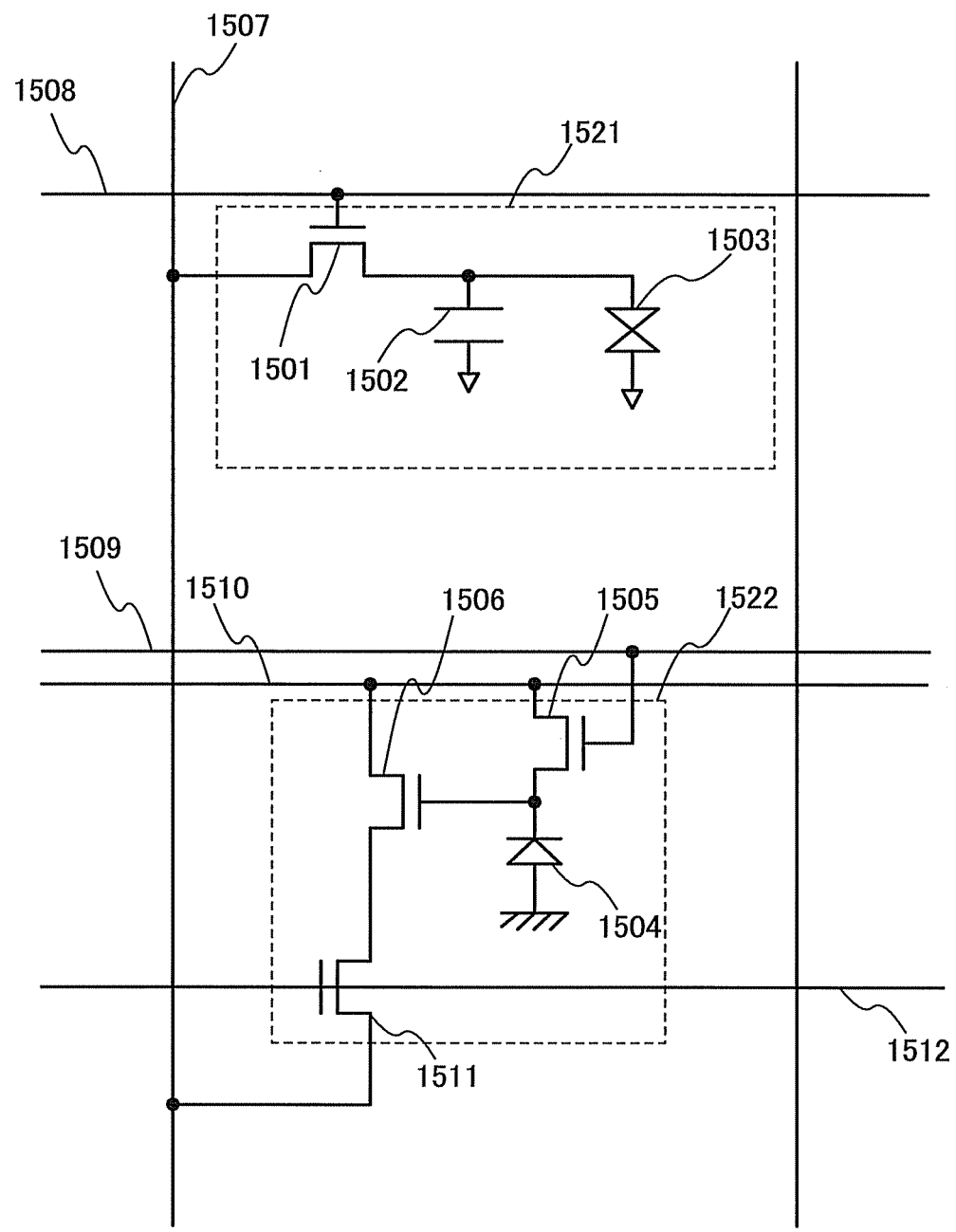
FIG. 15 is a diagram illustrating a structure of a pixel in a display device in Example 3.

FIG. 15 shows the structure of the pixel in Example 3. The pixel in Example 3 includes a display portion 1521 and a reading portion 1522 as shown in FIG. 15.

The display portion 1521 includes a display driver TFT 1501 which is a first transistor and functions as a liquid crystal element driver TFT, a storage capacitor 1502 which is a capacitor element, and a liquid crystal element 1503 which is a display element.

A gate of the display driver TFT 1501 is electrically connected to one of display gate drivers 111 and 112 through a gate line 1508 and one of a source and a drain of the display driver TFT 1501 is electrically connected to one of the source drivers 103 to 110 through a source line 1507.

The storage capacitor 1502 has a first terminal and a second terminal. The first terminal of the storage capacitor 1502 is electrically connected to the other of the source and the drain of the display driver TFT 1501 and a ground potential is applied to the second terminal of the storage capacitor 1502.

The liquid crystal element 1503 has a first terminal and a second terminal. The first terminal of the liquid crystal element 1503 is electrically connected to the first terminal of the storage capacitor 1502.

The reading portion 1522 includes a photo diode 1504 which is a photoelectric conversion element, a reset TFT 1505 which is a second transistor, a buffer TFT 1506 which is a third transistor, and a selecting TFT 1511 which is a fourth transistor.

A ground potential is applied to a first terminal of the photo diode 1504. Note that a different fixed potential other than the ground potential can be applied to the first terminal of the photo diode 1504.

A gate of the reset TFT 1505 is electrically connected to a reset control line 1509, one of a source and a drain of the reset TFT 1505 is electrically connected to a power supply line 1510, and the other of the source and the drain of the reset TFT 1505 is electrically connected to a second terminal of the photo diode 1504.

A gate of the buffer TFT 1506 is electrically connected to the other of the source and the drain of the reset TFT 1505 and one of a source and a drain of the buffer TFT 1506 is electrically connected to the power supply line 1510.

A gate of the selecting TFT 1511 is electrically connected to a selecting signal line 1512, one of a source and a drain of the selecting TFT 1511 is electrically connected to the other of the source and the drain of the buffer TFT 1506, and the other of the source and the drain of the selecting TFT 1511 is electrically connected to one of the source drivers 103 to 110 through the source line 1507.

Next, operation of the pixel of the display device in Example 3 will be described.

During the display period 301 shown in FIG. 6, the gate line 1508 is turned active in writing, the display driver TFT 1501 is turned on, and then the potentials of the source line, the first terminal of the storage capacitor 1502, and the first terminal of the liquid crystal element 1503 become equal. After that, the gate line 1508 is turned non-active, the display driver TFT 1501 is turned off, and the state is held until the next writing. This operation is the same as that of a known liquid crystal display device.

Next, operation during the reading period 302 will be described.

First, the reset control line 1509 is turned active and the reset TFT 1505 is turned on. The potential of the power supply line 1510, the potential of the second terminal of the photo diode 1504, and the gate potential of the buffer TFT 1506 become equal. Next, the reset control line 1509 is turned non-active and the reset TFT 1505 is turned off. When light enters the photo diode 1504, current flows and the gate potential of the buffer TFT 1506 decreases. At that time, the selecting signal line 1512 is turned active and the selecting TFT 1511 is turned on. Accordingly, the cathode potential of the photo diode is output to the source line 1507 through the selecting TFT 1511 and the buffer TFT 1506. Note that, although not shown, a signal supplied to the reset control line 1509 and the selecting signal line 1512 can be controlled by separately providing a driver circuit, for example.

By employing the structure in Example 3, reading operation can be performed more accurately than that in Example 1.

Example 3 can be appropriately combined with another example.

EXAMPLE 4

In Example 4, a structure in which an ambient light sensor is provided for a display device of the above-described examples will be described.

Figure 12:
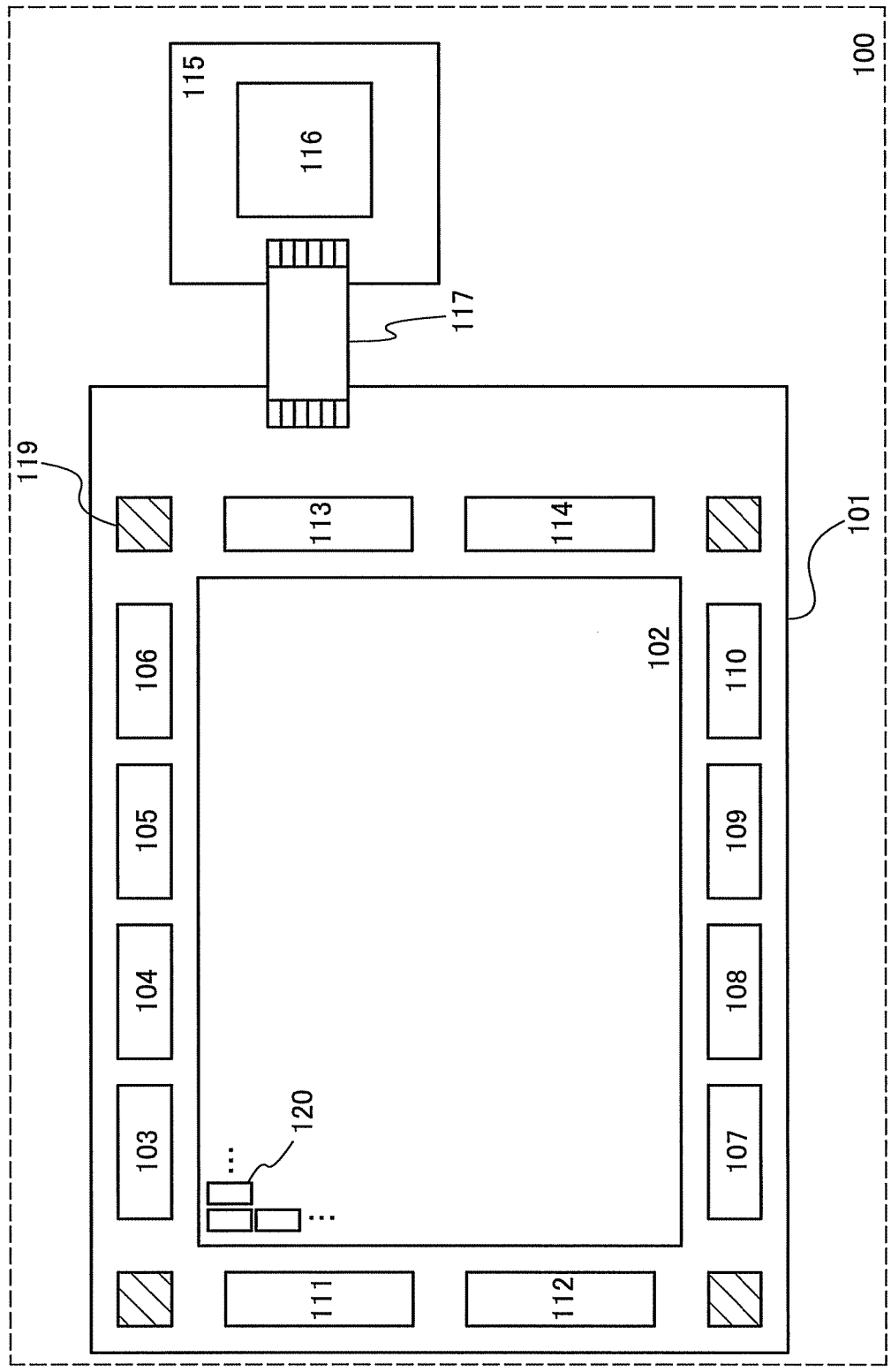
FIG. 12 is a diagram illustrating a structure of a display device in Example 4, to which an ambient light sensor is applied.

FIG. 12 shows a structure of a display device provided with an ambient light sensor as an example of the display device in Example 4. When a user watches the display device, the light intensity of a backlight needs to be high in the case of a liquid crystal display device so that the brightness of the display device is not lower than an ambient light even if surroundings are bright. Further, in the case of a light-emitting display device such as an organic EL display device, the intensity of the emitted light needs to be high. On the other hand, in the case where surroundings are dark, the intensity of light needs to be low because the brightness of the backlight or the emitted light appears to be dazzling for a user. In order to adjust light in such a manner, the ambient light sensor needs to be provided in the display device.

In the display device shown in FIG. 12, ambient light sensors 119 are formed in four corners of the display panel 101 and detect ambient light. Note that since components except the ambient light sensors 119 are the same as that of the display device shown in FIG. 1, the description of the display device shown in FIG. 1 is used as appropriate. In addition, the number of the ambient light sensors 119 is not limited to four. In order to form an ambient light sensor, a photo diode is required. However, since a photo diode is formed in a display screen of the display device with the touch-panel function which is one embodiment of the present invention, a step for forming an ambient light need not be newly added and an increase in cost can be suppressed.

Figure 13:
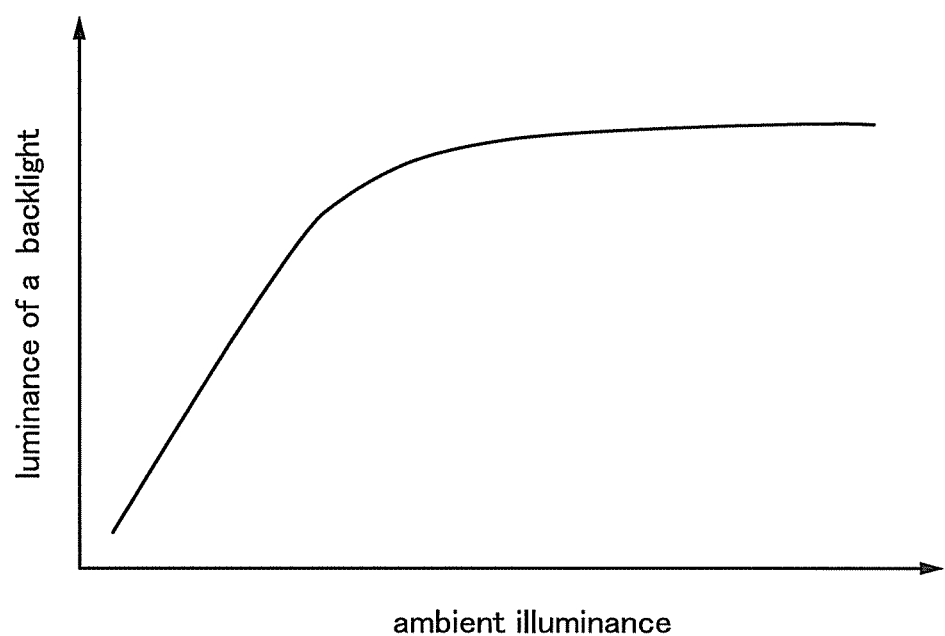
FIG. 13 is a diagram illustrating a relation between an ambient illuminance and the illuminance of a backlight in Example 4.

FIG. 13 shows a relation between ambient illuminance and the luminance of a backlight (also referred to as BL luminance). As shown in FIG. 13, in specific, since a region where adjustment with an ambient light sensor is required is a region with weak ambient light, linearity is required in the region with weak ambient light.

Figure 14:
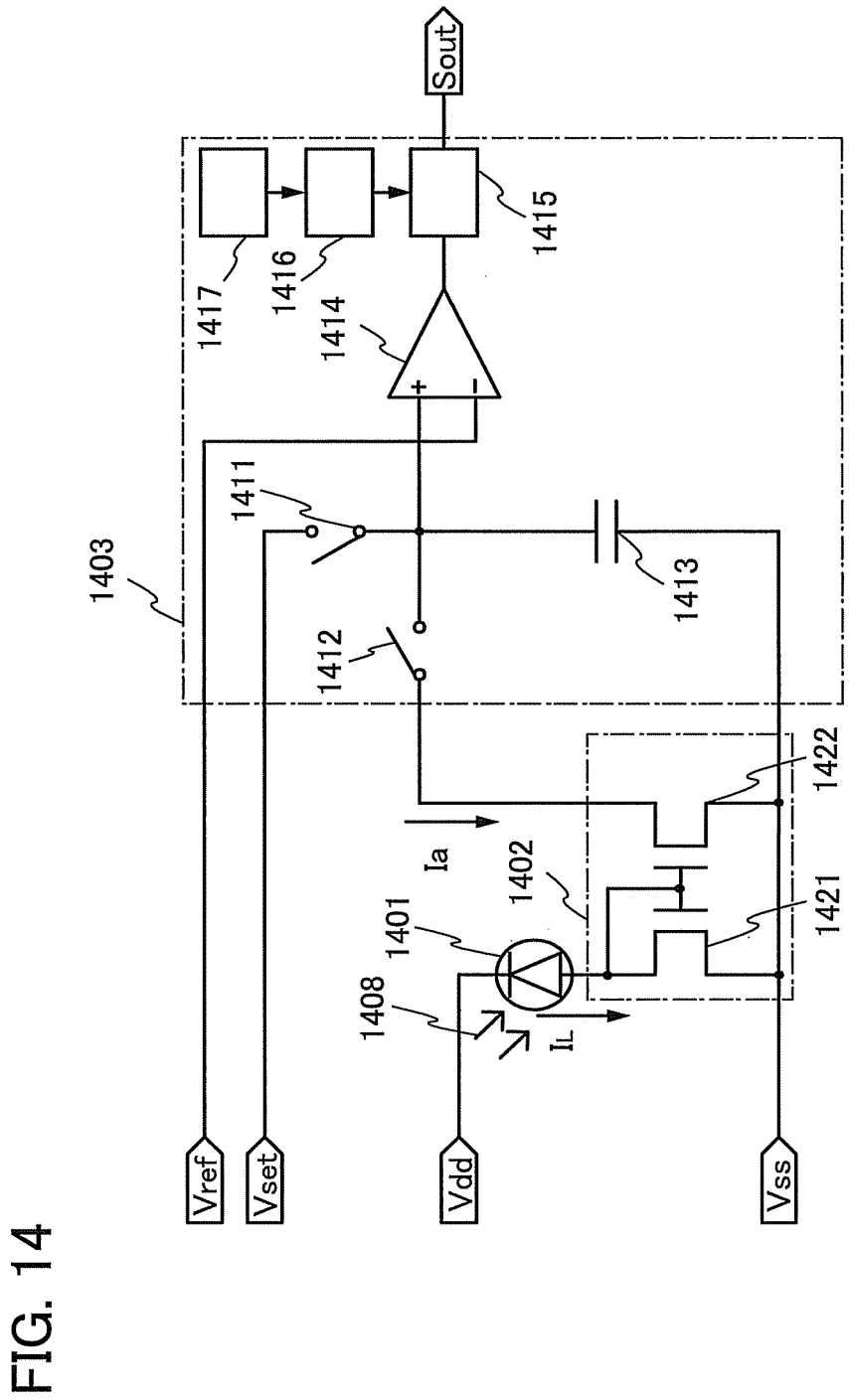
FIG. 14 is a block diagram illustrating a structural example of the ambient light sensor shown in FIG. 12.

FIG. 14 is a block diagram of a structural example of the ambient light sensor shown in FIG. 12. Note that although FIG. 14 shows a digital mode ambient light sensor, Example 4 is not limited to the digital mode and an analog mode ambient light sensor may be employed. Further, as the analog mode ambient light sensor, a linear ambient light sensor or a logarithmic ambient light sensor can be employed.

The ambient light sensor shown in FIG. 14 includes a photoelectric conversion element 1401, a current mirror circuit 1402, and an A/D converter 1403.

A high power supply potential (also referred to as Vdd) is applied to a first terminal, which is a cathode, of the photoelectric conversion element 1401. In addition, a second terminal, which is an anode, of the photoelectric conversion element 1401 is electrically connected to the current mirror circuit 1402.

The current mirror circuit 1402 has a function of generating current Ia which is based on photo current $I_L$ output from the photoelectric conversion element 1401 and flows in the same direction as the photo current $I_L$. The current mirror circuit 1402 includes a first n-channel transistor 1421 and a second n-channel transistor 1422. In addition, in the current mirror circuit 1402, a low power supply potential Vss is applied to one of a source and a drain of the first n-channel transistor 1421 and one of a source and a drain of the second n-channel transistor 1422.

The A/D converter 1403 has a function of outputting a first digital signal Sout in response to the current Ia generated in the current mirror circuit 1402.

Note that an arrow 1408 in FIG. 14 represents external light which enters the photoelectric conversion element 1401.

The photoelectric conversion element 1401 is an element with spectral sensitivity also to a wavelength range which deviates from that of optical light, such as a photoelectric conversion element formed using a single crystal silicon substrate, a polycrystalline silicon substrate, or the like. For example, in Example 4, the photoelectric conversion element 1401 is formed using a single crystal silicon substrate. The photoelectric conversion element formed using the single crystal silicon substrate has a high quantum efficiency not in a wavelength range of greater than or equal to 360 nm and less than or equal to 830 nm, which is a wavelength range of optical light, but at around 900 nm, which is in a range of infrared rays. Therefore, the spectral sensitivity of the photoelectric conversion element 1401 to external light is effective in a wide range from optical light to infrared rays. Then, the photo current $I_L$ which corresponds to the spectral sensitivity of the photoelectric conversion element 1401 flows.

Note that a PIN photo diode may be applied to the photoelectric conversion element 1401. In addition, a PN photo diode may be applied to the photoelectric conversion element 1401 instead of the PIN photo diode.

Further, a structural example of the A/D converter 1403 will be described.

The A/D converter 1403 includes a first switch 1411, a second switch 1412, a capacitor element 1413, a comparator 1414, a latch circuit 1415, a counter circuit 1416, and a clock generation circuit 1417.

In the A/D converter 1403, a first potential (also referred to as a charge potential or Vset) is applied to one terminal of the first switch 1411 and the other terminal of the first switch 1411 is electrically connected to a first terminal of the capacitor element 1413, one terminal of the second switch 1412, and a non-inverting input terminal of the comparator 1414. A low power supply potential Vss is applied to the second terminal of the capacitor element 1413. A second terminal of the second switch 1412 is electrically connected to the other of the source and the drain of the second n-channel transistor 1422 in the current mirror circuit 1402. A second potential (also referred to as a reference potential or Vref) is applied to an inverting input terminal of the comparator 1414. The clock generation circuit 1417 supplies a clock signal to the counter circuit 1416. The counter circuit 1416 counts the number of waves in the clock signal and supplies a count value obtained to the latch circuit 1415. The latch circuit 1415 latches (stores) the count value obtained from the counter circuit 1416 in response to a signal from the comparator 1414. This count value is a signal Sout.

Note that in this specification, any switch can be used as long as it can control conduction and non-conduction between one terminal and the other terminal without any particular limitation. As a switch, an electrical switch, a mechanical switch, or the like can be given. A field-effect transistor may be used, for example.

Note that since one terminal of the first switch 1411 is electrically connected to the first potential Vset which is a fixed potential, a p-channel transistor is preferably used as the first switch 1411. In addition, since the potentials of terminals on the both sides of the second switch 1412 vary, an analog switch is preferably used as the second switch 1412 in order to surely control on and off. Further, it is preferable that the first switch 1411 and the second switch 1412 be alternately turned on and off. Accordingly, since the first switch 1411 and the second switch 1412 can be operated with one signal input from a control circuit provided outside the ambient light sensor 119, a manufacturing cost can be reduced.

Note that when the first switch 1411 is turned on, the capacitor element 1413 is charged with the first potential Vset. Then, the second switch 1412 is turned on and the capacitor element 1413 discharges in accordance with current which flows to the current mirror circuit 1402. Therefore, the capacitance of the capacitor element 1413 is desirably set to be a value which enables the capacitor element 1413 to be charged with electric charge in consideration of a time for discharging the electric charge to the second n-channel transistor 1422 in the current mirror circuit 1402. Further, the first potential Vset is preferably lower than or equal to the high power supply potential Vdd and higher than the low power supply potential Vss. Note that in the case where the first potential Vset is set to have the same value as the high power supply potential Vdd, the high power supply potential Vdd is desirably a fixed potential.

The second potential Vref which is applied to the inverting input terminal of the comparator 1414 is a potential for obtaining an output signal of the comparator 1414 from the output terminal thereof by comparing the second potential Vref with the potential of the first terminal of the capacitor element 1413 which has been charged with the first potential Vset when the first switch 1411 is turned on and has discharged by the current mirror circuit 1402. The second potential Vref is preferably lower than the first potential Vset and higher than the low power supply potential Vss. As the output signal from the comparator 1414, a signal with an H level or an L level is output.

Note that the latch circuit 1415 latches a count value obtained from the counter circuit 1416 in response to the output signal from the comparator 1414. The count value stored in the latch circuit 1415 is a digital signal Sout.

In addition, the counter circuit 1416 counts the number of waves (also referred to as pulses) of a clock signal output from the clock generation circuit 1417. The count value obtained from the counter circuit 1416 is supplied to the latch circuit 1415.

Further, the clock generation circuit 1417 outputs the clock signal which is to be counted by the counter circuit 1416 to the counter circuit 1416. The clock generation circuit 1417 may be formed using a solid-state oscillator circuit, a CR oscillator circuit, a ring oscillator, or the like.

Note that the A/D converter 1403 can include a constant voltage circuit for generating a plurality of potentials such as a high power supply potential Vdd, a low power supply potential Vss, a first potential Vset, a second potential Vref, and the like in addition to the above-described structure. Further, the A/D converter 1403 can include a control circuit for switching on and off the first switch 1411 and the second switch 1412 and for resetting the latch circuit 1415 and the counter circuit 1416 in addition to the above-described structure.

Next, operation of the ambient light sensor 119 shown in FIG. 14 will be described.

When light enters the photoelectric conversion element 1401, photo current $I_L$ which is based on the illuminance of the incident light flows.

Further, in the current mirror circuit 1402, current Ia which is based on the photo current $I_L$ and flows in the same direction as the photo current $I_L$ is generated.

Next, in the A/D converter 1403, a digital signal is generated on the basis of the value of the current Ia.

In specific, during a period A, the first switch 1411 is off, the second switch 1412 is on, and a potential Vcap of one electrode of the capacitor element 1413 continuously varies in accordance with the amount of current Ia, which is obtained by amplifying the photo current $I_L$, and is not fixed. Further during the period A, a potential Vcomp of an output signal from the comparator 1414 continuously varies in accordance with the potential Vcap and is not fixed. Note that a clock signal is output from the clock generation circuit 1417 to the counter circuit 1416 during the period A. Therefore, although a count value is counted up in the counter circuit 1416, the count value is not stored in the latch circuit 1415 during the period A.

Next, during a period B, the first switch 1411 is on, the second switch 1412 is off, and the potential Vcap of one electrode of the capacitor element 1413 is the first potential Vset regardless of the amount of the current Ia. Further, during the period B, since the first potential Vset is higher than the second potential Vref regardless of the illuminance, the potential Vcomp of the output signal from the comparator 1414 has an H level.

Next, during a period C, the first switch 1411 is off, the second switch 1412 is on, and the potential Vcap of one electrode of the capacitor element 1413 decreases in accordance with the illuminance of light, which enters the photoelectric conversion element 1401, as the current Ia which flows to the current mirror circuit 1402 increases. The potential Vcap becomes the potential Vref after a predetermined time and then becomes the potential Vss when discharge of the capacitor element 1413 has been completed. At that time, when the potential Vcap of the capacitor element 1413 becomes the second potential Vref from the first potential Vset, the potential Vcomp of the output signal from the comparator 1414 has an L level. Then, the latch circuit 1415 stores the count value to be input in response to the signal. Note that at the same time as a time $t_0$ where the period C starts, the counter circuit 1416 and the latch circuit 1415 are reset and the counter circuit 1416 performs count-up in accordance with the clock signal. Then, the potential Vout of the output signal from the comparator 1414 is input to the latch circuit 1415, whereby the count value of the clock signal during a predetermined period is obtained as a digital signal.

Note that transistors of various types can be used as a transistor such as an n-channel transistor or a p-channel transistor. For example, a transistor including a semiconductor film typified by single crystal silicon, amorphous silicon, polycrystalline silicon, microcrystalline (also referred to as micro crystal) silicon, or the like can be used. Further, as a semiconductor used for a channel formation region, a compound semiconductor, preferably an oxide semiconductor, may be used. As the oxide semiconductor, for example, a zinc oxide, a titanium oxide, a magnesium zinc oxide, cadmium zinc oxide, a cadmium oxide, an In—Ga—Zn—O-base amorphous oxide semiconductor (a-IGZO), or the like can be used. Since the oxide semiconductor has a light-transmitting property, it can be provided so as to overlap with the photoelectric conversion element, whereby miniaturization of the display device can be achieved.

Further, when the relation between light intensity and photo current $I_L$ shows a comparatively linear curve and the amount of the photo current $I_L$ is small, a digital signal Sout output gradually changes depending on the photo current $I_L$. Therefore, in the case where the amount of the photo current $I_L$ is small, the range of the value of the digital signal Sout, which corresponds to the illuminance of the light with which the photoelectric conversion element is irradiated, can be wide. In specific, resolution for detecting the amount of light in a low illuminance region (e.g., more than or equal to 1 lux (1×) and less than or equal to 7000 lux) can be increased.

In the case where the relation between the illuminance and the digital value of the digital signal Sout shows not a downward-sloping curve but a so-called upward-sloping curve in which the digital value increases as the illuminance increases, the digital value saturates with a too high illuminance. Further, even if the resolution in the low illuminance region is intended to increase in the upward-sloping curve, a dynamic range of illuminance cannot be set large because the wide range of digital value corresponding to the low illuminance region is required. In contrast, in the structure having a relation of a downward-sloping curve in Example 4, a wide dynamic range can be obtained even if the resolution in the low illuminance range is increased because the digital value saturates with a low illuminance. Therefore, in the structure shown in Example 4, resolution can be increased especially in a low illuminance region, a digital signal with a digital value which corresponds to illuminance with high accuracy can be output, and a large dynamic range can be obtained.

As described above, by providing the ambient light sensor 119, failure of reading operation in each pixel due to external light can be suppressed even if incident light has an illuminance which is greater than or equal to a certain value.

This embodiment can be appropriately combined with another example.

EXAMPLE 5

In Example 5, electronic devices to which a display device which is one embodiment of the present invention is applied will be described.

The display device which is one embodiment of the present invention can be used as display portions of various electronic devices. Electronic devices to which the display devices which are one embodiment of the present invention are applied in display portions are described below.

As the electronic devices, for example, a camera such as a video camera and a digital camera, a game machine, a car navigation system, a personal computer, a mobile information terminal (such as a mobile computer, a mobile phone, or an electronic book), and the like can be given. Examples of these devices are illustrated in FIGS. 16A to 16F.

Figure 16A:
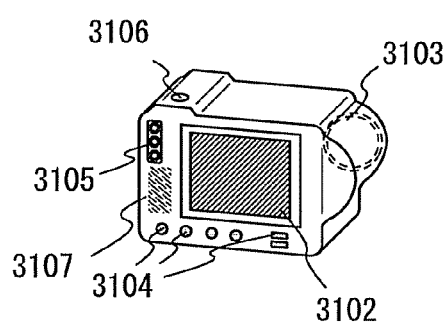
FIGS. 16A to 16F are diagrams each illustrating an electronic device to which a display device which is one embodiment of the present invention in Example 5 is applied.

FIG. 16A shows a digital camera. The digital camera shown in FIG. 16A includes a display portion 3102, an image receiving portion 3103, operation keys 3104, an external connection port 3105, a shutter button 3106, an audio output portion 3107, and the like. The display device which is one embodiment of the present invention can be used for the display portion 3102.

Figure 16B:
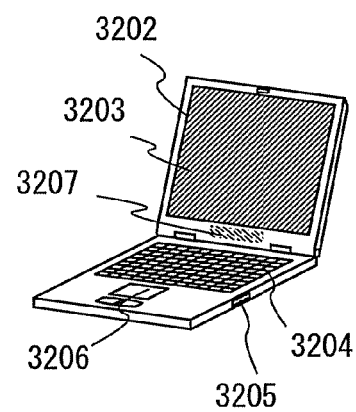

FIG. 16B shows a notebook personal computer. The notebook personal computer shown in FIG. 16B includes a housing 3202, a display portion 3203, a keyboard 3204, an external connection port 3205, a pointing device 3206, an audio output portion 3207, and the like. The display device which is one embodiment of the present invention can be used for the display portion 3203.

Figure 16C:
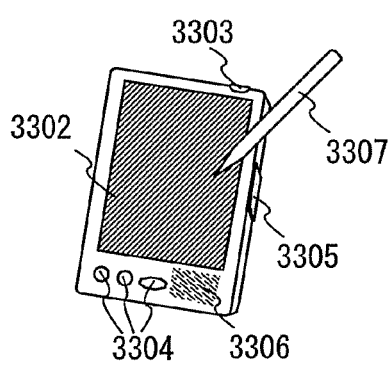

FIG. 16C shows a mobile information terminal. The mobile information terminal shown in FIG. 16C includes a display portion 3302, a switch 3303, operation keys 3304, an infrared ray port 3305, an audio output portion 3306, and the like. The display device which is one embodiment of the present invention can be used for the display portion 3302. Further, a mobile information terminal in Example 5 may include an input pen 3307 as shown in FIG. 16C. For example, by writing a letter on the display portion with the input pen 3307, a path of the input pen can be displayed on the display portion to display the written letter.

Figure 16D:
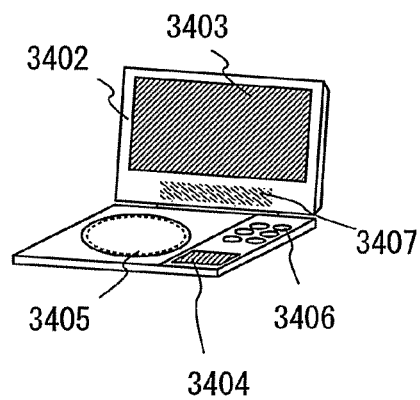

FIG. 16D shows an image reproducing device (in specific, a DVD player) provided with a memory medium. The image reproducing device provided with the memory medium shown in FIG. 16D includes a housing 3402, a memory medium (a CD, an LD, a DVD, or the like) reading portion 3405, operation keys 3406, a display portion (a) 3403, a display portion (b) 3404, an audio output portion 3407, and the like. The display portion (a) 3403 mainly displays image information and the display portion (b) 3404 mainly displays textual information. The display device which is one embodiment of the present invention can be used for the display portion (a) 3403 and the display portion (b) 3404. Note that as the image reproducing device provided with the memory medium, such as a CD player and a game machine, the display device according to one embodiment of the present invention can be used.

Figure 16E:
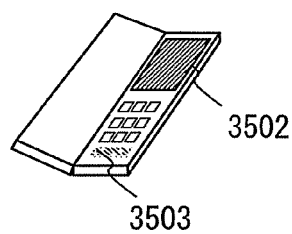

FIG. 16E shows a foldable mobile display device. The foldable mobile display device in FIG. 16E includes a display portion 3502, an audio output portion 3503, and the like. The display device which is one embodiment of the present invention can be used for the display portion 3502.

Figure 16F:
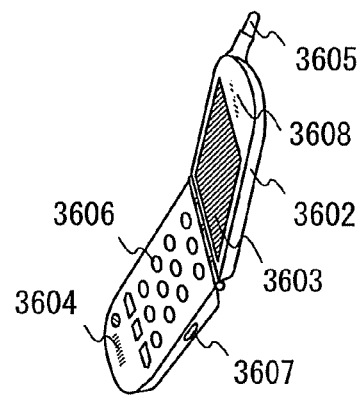

FIG. 16F shows a mobile phone. The mobile phone shown in FIG. 16F includes a housing 3602, a display portion 3603, an audio input portion 3604, an antenna 3605, operation keys 3606, an external connection port 3607, an audio output portion 3608, and the like. The display device which is one embodiment of the present invention can be used for the display portion 3603.

As set forth above, application range of the display device which is one embodiment of the present invention is extremely wide and the display device can be applied to electronic devices of every field. In addition, the electronic devices in Example 5 can be manufactured by using a structure that has any combination of Examples 1 to 4.

This application is based on Japanese Patent Application serial no. 2008-205994 filed with Japan Patent Office on Aug. 8, 2008, the entire contents of which are hereby incorporated by reference.

What is claimed is:

1. A display device comprising:
    a pixel portion including at least a first region and a second region;
    a first gate driver;
    a second gate driver;
    a first source driver; and
    a second source driver,
    wherein the first region comprises a plurality of first pixels, each of the plurality of first pixels comprising:
        a first display portion comprising a first transistor, a first capacitor element and a first display element; and
        a first reading portion comprising a second transistor and a first photoelectric conversion element,
    wherein the second region comprises a plurality of second pixels, each of the plurality of second pixels comprising:
        a second display portion comprising a third transistor, a second capacitor element and a second display element; and
        a second reading portion comprising a fourth transistor and a second photoelectric conversion element,
    wherein the first gate driver is electrically connected to a gate of the first transistor and a gate of the third transistor,
    wherein the second gate driver is electrically connected to the gate of the first transistor and the gate of the third transistor,
    wherein the first source driver is electrically connected to one of a source and a drain of the first transistor and one of a source and a drain of the second transistor,
    wherein the second source driver is electrically connected to one of a source and a drain of the third transistor and one of a source and a drain of the fourth transistor,
    wherein the other of the source and the drain of the first transistor is electrically connected to the first capacitor element and the first display element,
    wherein the other of the source and the drain of the third transistor is electrically connected to the second capacitor element and the second display element,
    wherein the other of the source and the drain of the second transistor is electrically connected to the gate of the first transistor, wherein the other of the source and the drain of the fourth transistor is electrically connected to the gate of the third transistor, wherein the gate of the second transistor is electrically connected to the first photoelectric conversion element, and wherein the gate of the fourth transistor is electrically connected to the second photoelectric conversion element.

2. The display device according to claim 1, further comprising:

an ambient light sensor formed integrally with the photoelectric conversion element.

3. The display device according to claim 1,
wherein the display element is a liquid crystal element.

4. The display device according to claim 1,
wherein the display device is an EL display device.

5. An electronic device including the display device according to claim 1.

6. A display device comprising:
a pixel portion including at least a first region and a second region;
a first gate driver;
a second gate driver;
a first source driver;
a second source driver; and
a controller configured to perform signal processing on output signals from the first source driver and the second source driver concurrently,
wherein the first region comprises a plurality of first pixels, each of the plurality of first pixels comprising:
a first display portion comprising a first transistor, a first capacitor element and a first display element; and
a first reading portion comprising a second transistor and a first photoelectric conversion element,
wherein the second region comprises a plurality of second pixels, each of the plurality of second pixels comprising:
a second display portion comprising a third transistor, a second capacitor element and a second display element; and
a second reading portion comprising a fourth transistor and a second photoelectric conversion element,
wherein the first gate driver is electrically connected to a gate of the first transistor and a gate of the third transistor,
wherein the second gate driver is electrically connected to the gate of the first transistor and the gate of the third transistor,
wherein the first source driver is electrically connected to one of a source and a drain of the first transistor and one of a source and a drain of the second transistor,
wherein the second source driver is electrically connected to one of a source and a drain of the third transistor and one of a source and a drain of the fourth transistor,
wherein the other of the source and the drain of the first transistor is electrically connected to the first capacitor element and the first display element,
wherein the other of the source and the drain of the third transistor is electrically connected to the second capacitor element and the second display element,
wherein the other of the source and the drain of the second transistor is electrically connected to the gate of the first transistor,
wherein the other of the source and the drain of the fourth transistor is electrically connected to the gate of the third transistor,
wherein the gate of the second transistor is electrically connected to the first photoelectric conversion element, and
wherein the gate of the fourth transistor is electrically connected to the second photoelectric conversion element.

7. The display device according to claim 6, further comprising an ambient light sensor formed integrally with the photoelectric conversion element.

8. The display device according to claim 6,
wherein the display element is a liquid crystal element.

9. The display device according to claim 6,
wherein the display device is an EL display device.

10. An electronic device including the display device according to claim 6.

* * * * *